A. J. KIRKPATRICK.
TOOL HANDLE COUPLING.
APPLICATION FILED JULY 9, 1921.
1,433,381. Patented Oct. 24, 1922.
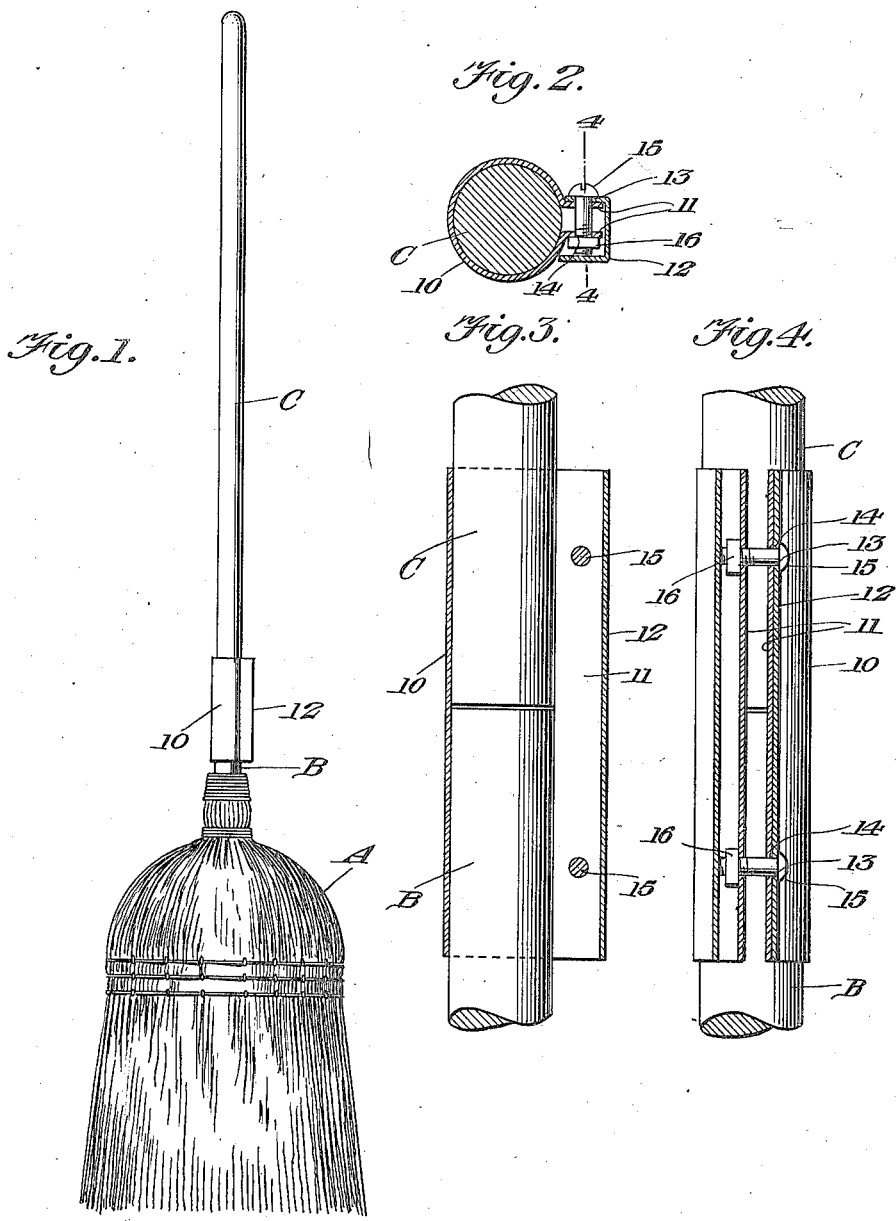

Patented Oct. 24, 1922.

1,433,381

UNITED STATES PATENT OFFICE.

AMANDUS J. KIRKPATRICK, OF ALTOONA, PENNSYLVANIA.

TOOL-HANDLE COUPLING.

Application filed July 9, 1921. Serial No. 483,634.

*To all whom it may concern:*

Be it known that I, AMANDUS J. KIRKPATRICK, a citizen of the United States, residing at Altoona, in the county of Blair and State of Pennsylvania, have invented new and useful Improvements in Tool-Handle Couplings, of which the following is a specification.

This invention relates to couplings for tool handles such as the handles of brooms, mops, hoes, and the like, and has for its object the provision of a coupling device whereby the usual long handle may be secured upon a very short stub handle projecting from the head of a broom, mop or other implement, the advantage being that a single long handle may be used in connection with a plurality of tool heads, thus effecting a great saving in lumber and also effecting a saving to manufacturers inasmuch as their finished articles may be packed and shipped much more cheaply on account of the absence of the long handles usually provided.

An additional object is the provision of a device of this character which will be simple and inexpensive in manufacture, easy to apply, strong in its holding action, efficient and durable in service, and a general improvement in the art.

With the above and other objects and advantages in view, the invention consists in the details of construction to be hereinafter more fully described and claimed and illustrated in the accompanying drawings in which—

Figure 1 is a side elevation of my device showing it associated with a broom,

Figure 2 is a cross sectional view,

Figure 3 is a longitudinal sectional view,

Figure 4 is a longitudinal sectional view on the line 4—4 of Figure 2.

Referring more particularly to the drawings, the letter A designates a broom head though it is to be understood that it might be the head of a rake, hoe, mop or other similar implement and projecting from this head is a short stub B. When my device is used it is contemplated that the heads of such implements as above mentioned be provided with only such a short stub, the usual long handle being omitted or being cut off. The letter C designates a long handle which might be the handle of a broken implement or which might be a new handle furnished by the manufacture, to be used in conjunction with the implement head.

In carrying out my invention I provide a coupling for securing the long handle C to the stub B and this coupling comprises a clamping sleeve 10 which is substantially cylindrical throughout its length and this has its edges formed with flanges 11 arranged in spaced relation. This sleeve is formed of any suitable sheet metal of more or less resilience. Associated with this sleeve is an elongated member 12 which is U-shaped in cross section and which is arranged in straddling relation to the flanges 11. One side of this member 12 is formed with holes 13 registering with holes 14 formed in the flanges 11 and through these registering holes are passed bolts 15 carrying nuts 16.

In the use of the device the sleeve 10 is engaged upon the handle C with the member 12 associated with the sleeve and one bolt 15 is fully tightened whereupon the sleeve will be firmly clamped upon the handle C and the position should be such that substantially half of the sleeve will project beyond the handle C. The sleeve is then engaged over the stub B and the other bolt 15 tightened whereupon it will be apparent that the two handles will be firmly secured so that a strong and rigid structure will be provided. The provision of the trough-like member 12 is important as it forms a housing covering the bolts, nuts and flanges and consequently prevents them from catching onto or striking against articles of furniture or the like.

While I have shown and described the preferred embodiment of my invention, it is of course to be understood that I reserve the right to make such changes in the form, construction and arrangement of parts as will not depart from the spirit of the invention or the scope of the subjoined claim.

Having thus described my invention, I claim:

A coupling of the character described comprising a cylindrical sleeve having its edges formed with outwardly extending flanges, the sleeve being adapted to be disposed upon one end of a handle and adapted to have its other end disposed upon a stub projecting from a tool head, a channel shaped member disposed in straddling relation to said flanges and formed in one side with spaced holes, the flanges being formed with spaced holes registering with said first named holes, and bolts passing through the registering holes and carrying nuts, the head of the bolts being disposed against the outer face of one side of the channel member and the nuts engaging against the outer face of the flange most remote from the head of the bolt with the nuts and the free ends of the bolts being enclosed between said last named flange and the adjacent side of the channel member.

In testimony whereof I affix my signature.

AMANDUS J. KIRKPATRICK.